Figure 1:
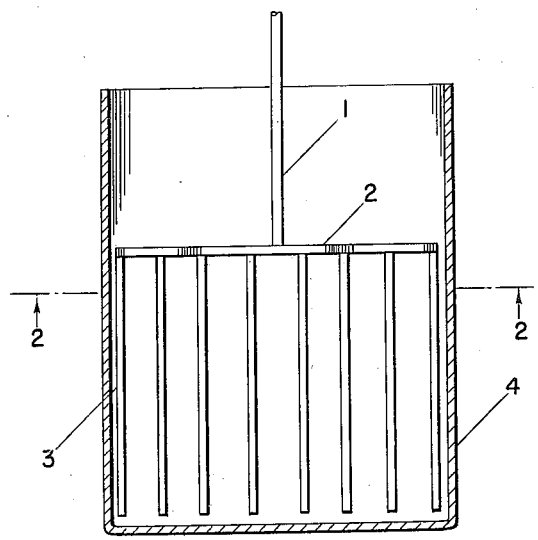

March 21, 1950    L. J. VENUTO    2,500,968
CARBON BLACK PROCESS
Filed Aug. 31, 1946

INVENTOR
LOUIS J. VENUTO
BY
Pennie, Edmonds, Morton & Barrows
ATTORNEYS

Patented Mar. 21, 1950

2,500,968

UNITED STATES PATENT OFFICE 2,500,968

CARBON BLACK PROCESS

Louis J. Venuto, Bayside, N. Y., assignor to Columbian Carbon Company, New York, N. Y., a corporation of Delaware Application August 31, 1946, Serial No. 694,409

3 Claims. (Cl. 23—314)

This invention relates to improvements in the process of converting loose furnace blacks to the pelleted or aggregated form, with the production of a pelleted product in which the pellets have sufficient strength to permit bulk handling and yet are sufficiently soft to permit ready dispersion in rubber or the like.

Channel carbon blacks are commonly converted, for shipping and other purposes, from the flocculent loose form in which they are produced to a pelleted form, and are shipped and stored in bulk, i. e., are shipped in tank cars, and handled in mechanical or other conveyors and stored in storage bins with gravity or other type of feed to the point of use. Various methods for the conversion of the flocculent channel black to the pelleted form are used, including the so-called single liquid method of the Glaxner Patent Re. 21,379, and the dry methods, such as those described in the Billings et al. Patent Re. 19,750 and the Price Patent 2,127,137. With channel black, it is relatively simple to produce a pelleted product having the requisite strength for handling in bulk without undue disintegration of the pellets with formation of dust or fines or loss of their free-flowing characteristics which are necessary for bulk handling.

With the furnace blacks, however, these processes, successful for the conversion of the flocculent channel black to the pelleted form, do not result in a pelleted product having the requisite strength for bulk handling. The furnace blacks are commonly converted to a pelleted form by one or the other of these processes partly to increase their apparent density and partly because if handled with some gentleness, they retain their form and the dusting incidental to the handling of the black is somewhat reduced. Also in this form it is more convenient to measure the quantities used. However, because of the weakness of the pelleted structures produced by these processes from furnace blacks, the pelleted furnace blacks cannot be handled by the bulk systems now in use, and cannot be shipped in tank cars. Thus if an attempt be made to ship a pelleted furnace black prepared by one of the common methods in a tank car, the disintegration or loss of the free-flowing characteristics of the pellets during the shipping period is such that the product will not flow from the bottom of the car as is required in discharging the car at the point of use, nor handle satisfactorily in subsequent mechanical handling systems.

The present invention provides an improved process for the conversion of flocculent furnace blacks to the pelleted form which results in a pelleted free-flowing product having the necessary strength to permit handling in bulk, the pelleted product thus having the advantages of dustlessness and capacity for handling and shipping in bulk characteristic of the pelleted channel blacks commonly produced.

The carbon blacks herein referred to as impingement or channel blacks are those which are made by burning a hydrocarbon in a zone to which there is supplied an amount of air insufficient for complete combustion of the hydrocarbon and causing the resultant flame to impinge upon a metallic surface upon which the black is deposited and from which it is collected. It is customary to use channel iron as the depositing surface, hence the name channel blacks.

As distinguished from impingement blacks, the blacks herein designated furnace blacks are made by burning a hydrocarbon in a chamber or furnace with an amount of air insufficient for complete combustion, and separating the carbon black from the furnace effluent gases. This general classification of furnace blacks as used herein also includes blacks formed by thermally decomposing a hydrocarbon by admixing it with hot gases or passing it in contact with highly heated surfaces.

The designation "furnace blacks," as used herein and in the accompanying claims, is intended to include all blacks of the type produced by such furnace methods, not excluding the so-called lamp blacks.

In accordance with my present invention, the furnace black is first subjected to what is herein designated a damp densing operation, in which the black is vigorously stirred with a restricted amount of water under such conditions that the black is thoroughly and uniformly dampened while avoiding the formation of finished pellets. Thereafter more water is added and the black further agitated under conditions adapted to effect pellet formation, as hereinafter more fully described.

The damp densing or first stage of my improved process may be carried out by vigorously stirring the black with a restricted amount of water, advantageously using a stirring mechanism which presents a thin knife or wedge-shaped forward edge. In this stage of the operation, the amount of water present should be less than that which under the conditions of agitation will result in the formation of pellets or beads having dense or hardened surfaces. Different carbon blacks vary as to the amount of water required to form such pellets, but the amount to be used with any particular carbon black may be readily determined by simple test. Further, the optimum amount of water to be used with any particular black will depend somewhat upon the type of stirring mechanism and the vigor with which the black is stirred.

Where a stirrer having a flat or blunted forward edge is used, there is a greater tendency toward the formation of small balls or beads of the carbon black before the black has been thoroughly and uniformly dampened. Under such conditions the carbon black forming the interior of the beads appears to be inadequately wetted, and as the operation proceeds the exterior surface of the beads becomes more dense and interferes with the penetration of water into the interior of the pellet. Under such conditions the amount of water added in the initial stage of the operation must be controlled more carefully to avoid the formation of pellets having outer surfaces which are relatively impervious to water.

Where a stirrer having relatively sharp forward edges is used in the initial stage of my operation, there is less tendency toward the formation of pellets of this type and somewhat greater leeway is permissible with respect to the amount of water added in the initial stage of the operation.

In the second stage of the operation, the uniformly dampened black is admixed with additional water and subjected to further agitation. The amount of water added in this stage of the process is likewise subject to some variation. It should be sufficient to bring the total amount of water added to that at which satisfactory pellets of the particular black will result, and will vary somewhat depending upon the amount of water added in the initial stage of the process and the density and other characteristics of the black. In each of the stages of the operation the water may be added in small increments, or it may be added all at once, but preferably in increments.

A more finely divided black will generally require relatively larger amounts of water. Generally, the more dense the black, the less water required. A well densed small particle size furnace black may require approximately the same amount of water as a less dense but coarser particle size black. Also, the amount of water added is somewhat influenced by the oil content of the black, a black of higher oil content usually requiring a larger amount of water than one of smaller oil content.

Satisfactory results are generally more easily attained where the black is partially deaerated by mechanical agitation, for instance, prior to subjection to the present process. For example, deaerating by conventional means to a density of about 30 pounds per cubic foot prior to the damp densing stage of my present process is desirable, though not essential.

In the second stage of my operation, the conventional type apparatus such as used in the single liquid method disclosed in the previously noted Glaxner patent may be employed. However, I have found that the desired results are usually more readily attained where the mixing apparatus employed is of a type equipped with stirrer elements so arranged as to cause the black to move outwardly away from the center and toward the curved sides of the cylindrical walls of the container so as to exert a roller pressure or side-swiping action on the carbon black particles or agglomerates.

The roller pressure to which I refer is not to be confused with a simultaneous exertion of pressure on the black from opposite directions such as would result in the crushing of the pellets as formed or a grinding of the carbon black against the inner surface of the container. It is, however, a wiping or side-swiping action, as opposed to a direct full-force impact. In other words, the impact between the carbon black and the stirrer element is such as to tend to throw the black radially out of the path of the stirrer. Such stirring action may be obtained in an apparatus in which the stirring elements, for instance round bars, are arranged in echelon formation, as disclosed in the accompanying drawing.

It has previously been proposed in connection with the densing of carbon black to agitate carbon black with water to form a paste or wet plastic mass. It has been assumed that this resulted in a uniform wetting of the carbon black. Where the carbon black being processed is of the impingement type, it is sufficiently uniformly wetted by such operation for pelleting purposes. However, as previously noted, when a furnace black is stirred with an amount of water sufficient to form a paste or wet plastic mass, the carbon black quickly balls up into small beads or pellets before the black is uniformly wetted, and if the agitation is continued, pellets having inadequately wetted and insufficiently densed interiors and outer surfaces relatively impervious to water result.

While I am not to be bound by any expressed or implied theory as to the difference in behavior of channel black and furnace blacks when subjected to conventional pelleting operations, it is my present opinion that this difference is due to a difference in particle size and the nature and quantity of the oil constituent present in furnace blacks. The furnace blacks generally contain a higher proportion of oily matter which appears to repel water and retard the uniform wetting of the black, and where the pelleting is permitted to proceed to a point where a dense outer surface is formed before such uniform wetting is accomplished, the black composing the interior of the pellet is shielded from the water by the outer covering of more dense black, and results in a pellet of weak structure.

Regardless of the accuracy of the foregoing theory as to the cause of the failure in the past to produce adequately strong furnace black pellets, I have found that satisfactory pellets of furnace black may be prepared, provided the pelleting is retarded until uniform wetting of the black has been effected.

Figure 2:
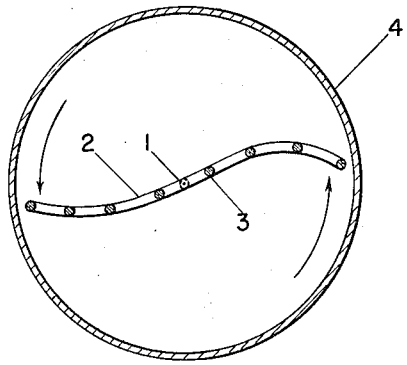

In small scale laboratory operation, I have with particular advantage used in the second stage of my operation an apparatus illustrated by the accompanying drawing, of which Fig. 1 is a vertical sectional view of the apparatus, and Fig. 2 is a horizontal sectional view along the line 2—2 of Fig. 1.

In each figure of the drawing, a drive shaft is shown at 1 which is adapted to be driven in the indicated direction by any convenient source of power, for instance an electric motor, not shown in the drawing. An S-shaped rigid cross member 2 is secured to the lower end of the shaft 1, and is adapted to rotate with the shaft. The prongs 3 are rounded rods rigidly secured to and projecting downwardly from the S-shaped member 2 and extending just short of the bottom of the vessel 4.

In the apparatus shown, the respective prongs of the stirrer are parallel to the axis of rotation but in operation, by reason of their staggered position, the result is that of throwing the carbon black particles toward the walls of the container out of the path of the stirrer.

Apparatus similar to that shown in the drawing has been used successfully in the initial or damp densing stage of my process, but for such purpose I prefer to use a stirrer of which the cross member corresponding to 2 is straight instead of S-shaped and the prongs corresponding to 3 have sharp forward edges as previously described.

As previously noted, the amount of water required to form bead-like pellets may be readily determined for any particular black by simple test, as is well known to the industry. The amount of water used in the first stage of my present process is considerably less than the total amount of water required to form free-flowing pellets, and generally is about one-third to about three-fourths of the total amount of water used, advantageously about one-half.

In the second stage of the operation, it is desirable to operate the stirrer at a speed such as to result in keeping the beads as formed in a state of suspension and toward the outer portion of the vessel. This tends to compact the pellets and form firm, hard beads of adequate strength when preceded by the damp densing operation previously described.

The invention will be found illustrated by its application to a furnace black of the type marketed under the trade name "Furnex." This black in powdered form is usually of a density of 17½ to 23 lbs. per cubic foot, depending upon previous treatment. 20 parts of this black was placed in an apparatus of the type shown in the drawings and was thoroughly wetted by vigorously stirring for a period of 3 to 5 minutes with approximately 10 parts of water. This operation was carried out under such conditions that pellet or lump formation was avoided. At the end of the damp densing stage an additional 10 parts of water was added and the black and water stirred together for a period of 10 to 15 minutes. This additional water was added in several increments during the stirring. During this period, the carbon black formed into relatively small, substantially spherical beads or pellets. Thereafter the beads were stirred for an additional 5 to 10 minutes at a somewhat reduced speed for further compacting the pellets. In the first stage of the operation a stirrer equipped with sharp forward edges was used, while in the latter stages of the treatment a stirrer having rounded forward edges such as shown in the drawing was employed.

Satisfactory results have been obtained in the pelleting of black of the "Furnex" type where the proportion of total water has been varied from about 13 to about 16 parts for each 20 parts of the furnace black, of which approximately 10 parts of the water was added in the preliminary or damp densing stage of treatment.

In carrying out the process as applied to furnace black marketed under the trade name "Statex 93" the total proportion of water used has been varied over the range of about 14 to about 18.5 parts per 20 parts of the black. The operation has been carried out as just described with reference to the "Furnex" carbon, about 10 parts of the water being added in the preliminary stage. In each instance, after the formation of the pellets had been completed, they were subjected to a conventional drying operation.

By the foregoing treatment the density of raw "Furnex" black of 17.5 lbs. per cubic foot was increased to 47.5 lbs. per cubic foot by the preliminary damp densing operation, and the density of the dried pellets was 33 pounds per cubic foot. The density of a loose "Statex 93" furnace black of 17.3 lbs. per cubic foot was increased by the damp densing operation to 32 lbs. per cubic foot, and the dried pellets resulting therefrom had a density of 22.1 lbs. per cubic foot. A "Statex 93" furnace black which had been predensed by mechanical deaeration to a density of 29.1 pounds per cubic foot was increased to 44.3 pounds per cubic foot by the damp densing operation and the resultant pellets after drying had a density of 30.1 pounds per cubic foot.

The pellets resulting from each of the foregoing specific examples were found to be of adequate strength to withstand bulk handling without undue crushing or dusting and without loss of their free-flowing characteristics.

I claim:

1. In a process for converting furnace carbon black to a pelleted form by agitating the black with a restricted amount of water with an agitator having surfaces which exert a sufficient compacting action on the carbon black particles to form them into pellets having dense, hardened surfaces, the improvement which comprises subjecting the carbon black to a preliminary densing operation by agitating it with an amount of water less than that required for the pelleting with an agitator having a lesser compacting surface which exerts an insufficient compacting action on the particles thereof to form them into pellets having dense, hard surfaces until the carbon black has been uniformly dampened and substantially reduced in volume.

2. In a process for converting furnace carbon black to a pelleted form by agitating the carbon black with a restricted amount of water, the improvement which comprises subjecting the carbon black to a two-stage operation, in the first stage of which the carbon black is subjected to a densing operation by agitating it with an amount of water less than that required for the pelleting with an agitator having surfaces which exert an insufficient compacting action on the particles thereof to form them into pellets having dense, hard surfaces until the carbon black has been uniformly dampened and substantially reduced in volume, and in the second stage agitating the uniformly dampened and predensed carbon black and additional water with an agitator having surfaces which exert a greater compacting action than the agitator surfaces of the agitator used in the first stage and form the carbon black into pellets having dense, hardened surfaces.

3. In a process for converting furnace carbon black to a pelleted form by agitating the carbon black with a restricted amount of water, the improvement which comprises subjecting the carbon black to a two-stage operation, in the first stage of which the carbon black is subjected to a densing operation by agitating it with an amount of water less than that required for the pelleting with an agitator having surfaces which exert an insufficient compacting action on the particles thereof to form them into pellets having dense, hard surfaces until the carbon black has been uniformly dampened and substantially reduced in volume, and in the second stage agitating the uniformly dampened and predensed carbon black and additional water in a chamber having cylindrical walls by means of a coaxially positioned stirrer having surfaces which, in operation, exert a side swiping force on the carbon black which forces it radially outwardly toward the cylindrical walls and cause a compacting action to be exerted on it which is sufficiently greater than that exerted on the carbon black in the first stage as to form the carbon black into pellets having dense, hardened surfaces.

LOUIS JOSEPH VENUTO.

REFERENCES CITED

The following references are of record in the file of this patent:

UNITED STATES PATENTS

| Number | Name | Date |
|---|---|---|
| 2,131,686 | Heller et al. | Sept. 27, 1938 |
| 2,213,059 | Teegerstrom | Aug. 27, 1940 |
| 2,228,704 | Offutt | Jan. 14, 1941 |